(12) United States Patent
Stratmann

(10) Patent No.: US 10,133,262 B2
(45) Date of Patent: Nov. 20, 2018

(54) BEHAVIOR-MODIFYING SHARED ELECTRONIC DEVICE

(71) Applicant: Hand Hygiene Systems, San Jose, CA (US)

(72) Inventor: Greg Stratmann, San Jose, CA (US)

(73) Assignee: Hand Hygiene Systems, LLC, San Jose, CA (US)

( * ) Notice: Subject to any disclaimer, the term of this patent is extended or adjusted under 35 U.S.C. 154(b) by 172 days.

(21) Appl. No.: 15/056,691

(22) Filed: Feb. 29, 2016

(65) Prior Publication Data

US 2016/0179089 A1 Jun. 23, 2016

Related U.S. Application Data

(63) Continuation-in-part of application No. 12/331,112, filed on Dec. 9, 2008, now Pat. No. 9,271,611, which (Continued)

(51) Int. Cl.
| | | |
|---|---|---|
| *A61L 2/18* | (2006.01) | |
| *G05B 19/416* | (2006.01) | |
| *E05B 1/00* | (2006.01) | |
| *E05F 15/70* | (2015.01) | |
| *E05F 15/75* | (2015.01) | |

(52) U.S. Cl.
CPC ........ *G05B 19/4166* (2013.01); *E05B 1/0069* (2013.01); *E05F 15/70* (2015.01); *E05F 15/75* (2015.01); *E05Y 2800/00* (2013.01); *E05Y 2800/426* (2013.01); *E05Y 2900/112* (2013.01); *G05B 2219/45238* (2013.01); *Y10T 16/46* (2015.01)

(58) Field of Classification Search
CPC ........................................................ A61L 2/18
See application file for complete search history.

(56) References Cited

U.S. PATENT DOCUMENTS

| 4,562,664 A | 1/1986 | Kambic |
| 4,620,502 A | 11/1986 | Kimble |

(Continued)

OTHER PUBLICATIONS

International Search Report for International Application PCT/US2008/05443 dated Jul. 22, 2008.

(Continued)

*Primary Examiner* — Donald R Spamer
(74) *Attorney, Agent, or Firm* — Steptoe & Johnson LLP

(57) ABSTRACT

A hand hygiene system is disclosed. According to one embodiment, the hand hygiene system includes a hand sanitizer dispensing unit that dispenses a hand sanitizer, a shared electronic device in communication with the hand sanitizer dispensing unit and a manual override device. The hand sanitizer dispensing unit transmits an activation signal to the shared electronic device. The shared electronic device reduces resistance to access to the shared electronic device, upon receipt of the activation signal from the hand sanitizer dispensing unit. The manual override device allows access to the shared electronic device independent of the activation signal of the hand sanitizer dispensing unit. The manual override device also provides greater resistance to access the shared electronic device than provided from the receipt of the activation signal.

20 Claims, 9 Drawing Sheets

Related U.S. Application Data is a continuation-in-part of application No. 12/114,519, filed on May 2, 2008, now abandoned.

(60) Provisional application No. 61/047,281, filed on Apr. 23, 2008.

(56) References Cited

U.S. PATENT DOCUMENTS

| | | | |
|---|---|---|---|
| 4,896,144 A * | 1/1990 | Bogstad | G08B 7/06 340/691.6 |
| 5,687,507 A | 11/1997 | Beran | |
| 2002/0175182 A1 | 11/2002 | Matthews | |
| 2003/0008791 A1 | 1/2003 | Chiang | |
| 2006/0121098 A1 | 6/2006 | Mendoza et al. | |
| 2006/0289558 A1 | 12/2006 | Parker | |
| 2007/0213877 A1 * | 9/2007 | Hart | G07C 9/00031 700/282 |
| 2007/0216267 A1 | 9/2007 | Johanning | |
| 2007/0256362 A1 | 11/2007 | Hansen | |
| 2008/0087719 A1 | 4/2008 | Sahud | |

OTHER PUBLICATIONS

International Preliminary Report on Patentability for International Application PCT/US2008/05443 dated Oct. 26, 2010.
International Search Report for International Application PCT/US2008/13519 dated Jan. 29, 2009.
International Preliminary Report on Patentability for International Application PCT/US2008/13519 dated Oct. 26, 2010.
Center for Disease Control and Prevention, "Guideline for Hand Hygience in Health-Care Settings," Morbidty and Mortality Weekly Report, Oct. 25, 2002; vol. 51, pp. 1-45.

* cited by examiner

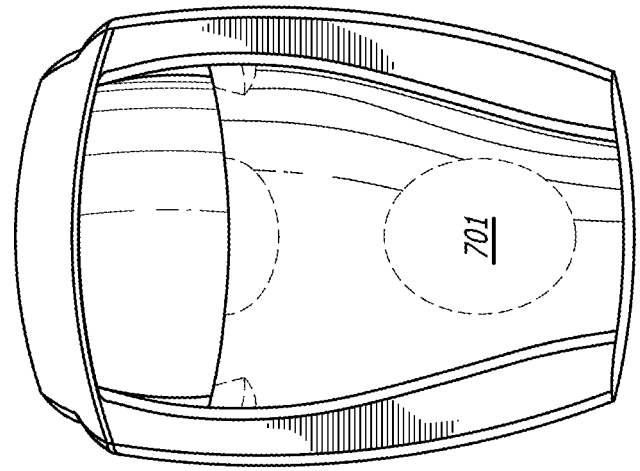
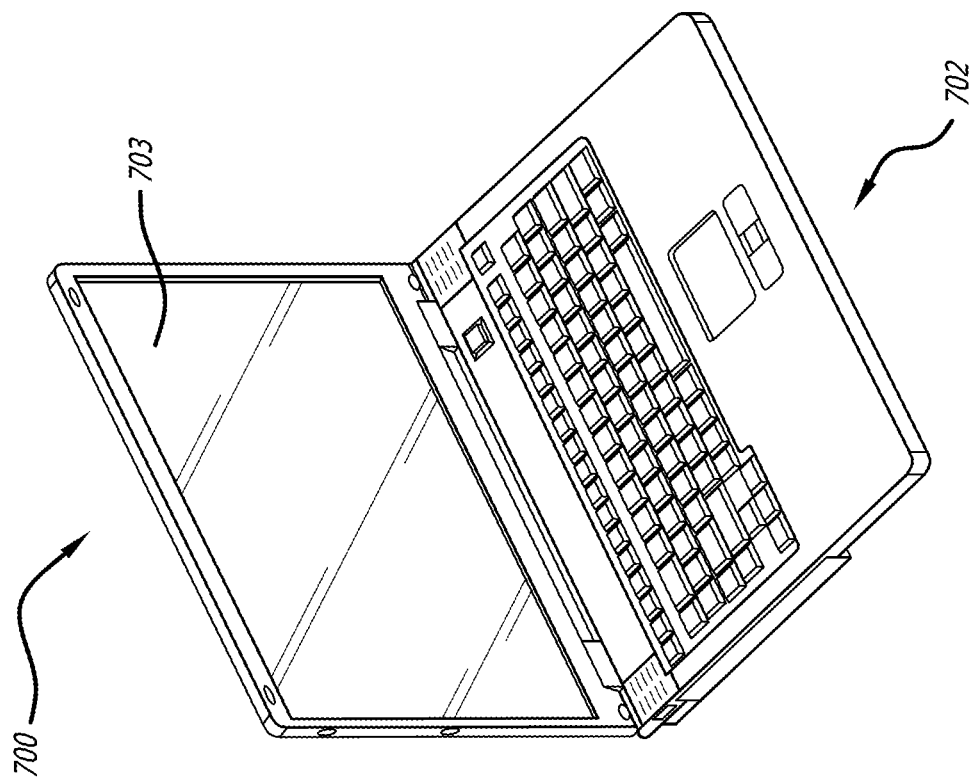
FIG. 7

BEHAVIOR-MODIFYING SHARED ELECTRONIC DEVICE

CROSS-REFERENCE TO RELATED APPLICATIONS

This application is a continuation-in-part of U.S. patent application Ser. No. 12/331,112, filed on Dec. 9, 2008, which was the continuation-in-part of, and claims priority from, U.S. patent application Ser. No. 12/114,519, filed May 2, 2008, which claims the benefit of the filing date of U.S. provisional patent application 61/047,281, filed Apr. 23, 2008, each hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The invention relates generally to the field of hand sanitation, and particularly to systems that encourage the use of a hand sanitation measures by rewarding a desired behavior with ease of access to a shared electronic device for hand sanitation by a path of least resistance, and discouraging undesirable behavior by associating it with a path of greater resistance to access.

BACKGROUND

Despite training, health-care, food, and transportation workers are poorly compliant with practices known to reduce the spread of infectious microbes, such as hand hygiene measures. For example, even the most vigorous attempts of infection control departments to increase healthcare worker (e.g., nurses, physicians, and technicians) compliance with hand hygiene is limited to a sustained compliance rate of only 40-70%.

Health-care-associated infections are a common cause of morbidity and mortality in the United States and are among the most common, completely preventable, adverse events in health-care. Infectious microbes that can be acquired or transmitted in a healthcare setting include: *Acinetobacter baumannii*; *Burkholderia cepacia*; chickenpox (varicella); *Clostridium difficile*; *Clostridium sordellii*; Creutzfeldt-Jakob Disease (CJD); ebola virus (viral Hemorrhagic Fever); hepatitis viruses A and B; influenzaviruses; MRSA (methicillin-resistant *Staphylococcus aureus*); mumps; norovirus; streptococcal species; *Pseudomonas Aeruginosa*; parvovirus; poliovirus; pneumonia; rubella; SARS; *S. pneumoniae*; tuberculosis; VISA (vancomycin intermediate *Staphylococcus aureus*); and VRE (vancomycin-resistant enterococci).

Poor compliance with hand hygiene protocols in the food service (e.g., food poisoning) and transportation (e.g., airplanes, cruise ships, and trains) industries also results in significant morbidity and mortality.

There is a need of systems designed to encourage hand sanitation to reduce the spread of infectious microbes in public and private settings.

SUMMARY

A hand hygiene system is disclosed. According to one embodiment, the hand hygiene system includes a hand sanitizer dispensing unit that dispenses a hand sanitizer, a shared electronic device in communication with the hand sanitizer dispensing unit and a manual override device. The hand sanitizer dispensing unit transmits an activation signal to the shared electronic device. The shared electronic device reduces resistance to access to the shared electronic device, upon receipt of the activation signal from the hand sanitizer dispensing unit. The manual override device allows access to the shared electronic device independent of the activation signal of the hand sanitizer dispensing unit. The manual override device also provides greater resistance to access the shared electronic device than provided from the receipt of the activation signal.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWING

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 7 illustrates a system including a hand sanitizer dispensing unit in communication with a shared electronic device, according to one embodiment.

Figure 1:
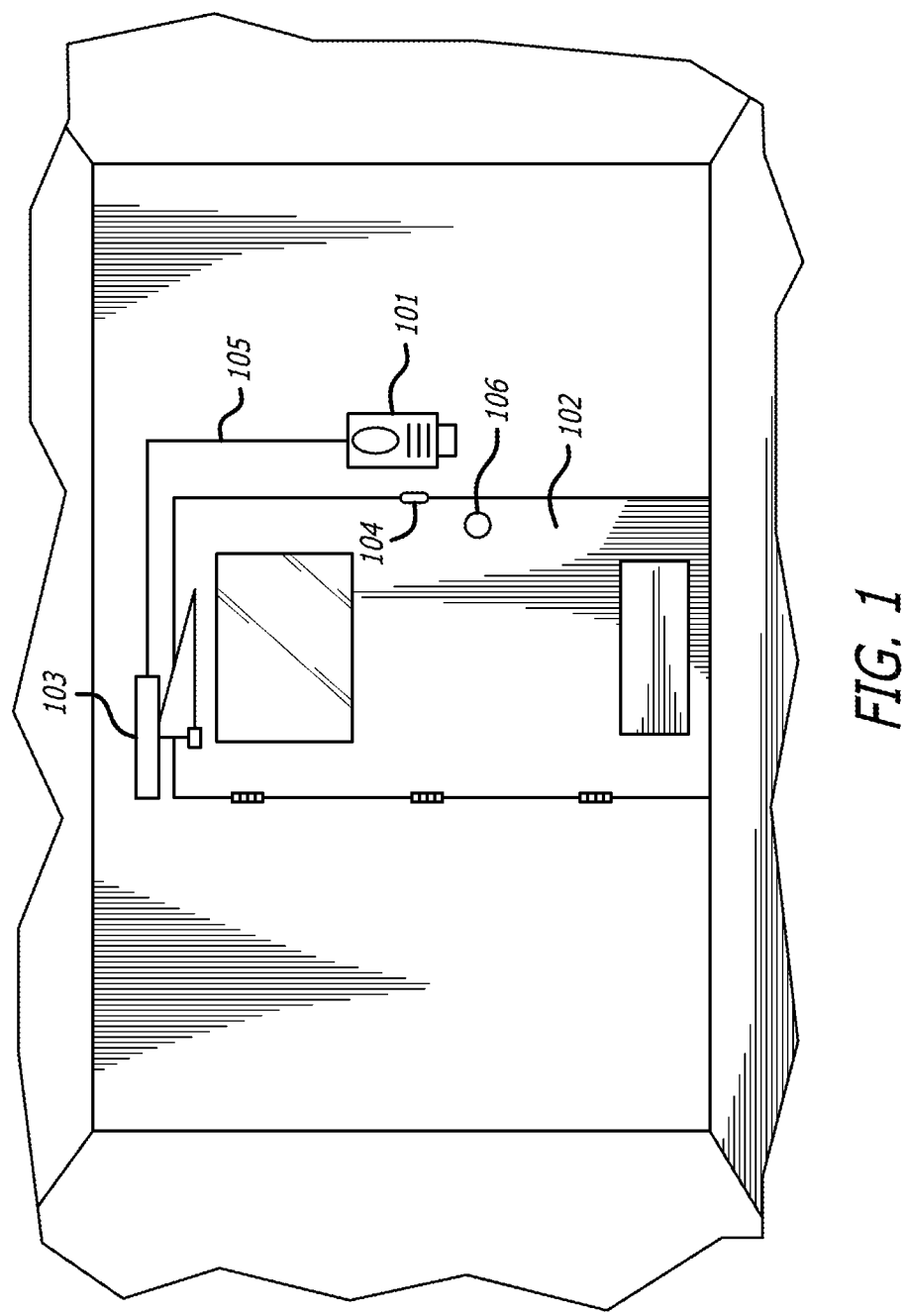
FIG. 1 is a perspective view of the door opening system of the invention in the context of a single door threshold.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A hand hygiene system is disclosed. According to one embodiment, the hand hygiene system includes a hand sanitizer dispensing unit that dispenses a hand sanitizer, a shared electronic device in communication with the hand sanitizer dispensing unit and a manual override device. The hand sanitizer dispensing unit transmits an activation signal to the shared electronic device. The shared electronic device reduces resistance to access to the shared electronic device, upon receipt of the activation signal from the hand sanitizer dispensing unit. The manual override device allows access to the shared electronic device independent of the activation signal of the hand sanitizer dispensing unit. The manual override device also provides greater resistance to access the shared electronic device than provided from the receipt of the activation signal.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

The different embodiments of the current disclosure relates to a system that reduces the spread of infectious microbes by facilitating and rewarding the use of a hand sanitizer dispensing unit. By rewarding the use of a hand sanitizer, the current system increases compliance with hygiene protocols and reduces the spread of infectious microbes. Each embodiment of the current system, when activated, transmits a signal that facilitates access to a defined workflow or space. Thus, the different embodiments of the current system improve hand hygiene and reduce the spread of infectious microbes by rerouting the path of least resistance to incorporate hand sanitizer use and therefore encourage the use of hand sanitizers. However, the nature of the different embodiments of the current system may not be punitive. While it is certainly possible to combine some aspects of the different embodiment of the current system with means to measure, record and report the compliance of specific users, the spirit of this invention is to make observation and retribution unnecessary.

The term, "door", as used herein is a moveable barrier meant to separate two distinct spaces within a structure. The door can be a single, double, sliding (vertical or horizontal), or revolving door. The door can be opened manually or automatically by a door opening device, as defined herein. Elevator doors and other doors found in the interior or exterior of modes of transportation are also suitable doors for use in the present invention. The door can be located in a stationary structure (e.g., a hospital, airport) or in a moving transport object (e.g., a train, boat, or airplane). The door can separate two public or private spaces or separate a public space from a private space (e.g., a door between a hospital hallway and a patient room). A door can also be an access panel or drawer, such as those found in closets, cabinets (e.g., supply or storage cabinets), tables, or desks.

The term "effective amount," as used herein, is a measured quantity of a chemical or radiological hand sanitizer that is necessary to reduce (e.g., by 5%, 10%, 20%, 30%, 40%, 50%, 60%, 70%, 80%, 90%, 95%, or 99%) or eliminate infectious microbes or pathogens from the skin surface of the hands, wrists, or forearms.

As used herein, "hand sanitizer" or "sanitizer" is any compound used to remove, reduce, or kill microbes and pathogens (e.g., bacteria, fungi, parasites, viruses, and the like) upon application to the hands or lower arms of a human that does not require removal following use, as required with standard hand-washing with soap and water. Hand sanitizers can be chemically or radiologically-based. A chemical sanitizer can be in a liquid, gel, foam, or powder form or embedded within a substrate, such as a towel, towelette, or napkin. Active ingredients in a chemical hand sanitizer include but are not limited to: triclosan, ethanol (e.g., 62% w/w ethanol, such as PURELL®), isopropanol, n-propanol, povidone-iodide, chlorhexidine gluconate, octenidine, chloroxylenol, hexachlorophene, alkyl benzalkonium chloride, benzethonium chloride, cetrimide, cetylpyridium chloride, or proteins. Chemical hand sanitizers are discussed in further detail in the Center for Disease Control and Prevention's Morbidity and Mortality Weekly Report entitled "Guideline for Hand Hygiene in Health-Care Settings" (Vol. 51, Oct. 25, 2002). Chemical hand sanitizers can include other agents, such as emollients (e.g., moisturing crèmes, lotions, and salves), chemical stabilizers, or dyes that alter the sanitizer's chemical, physical, or biological (e.g., therapeutic) properties. On the other hand, a radiological-based hand sanitizer is a device that, upon activation, exposes a user's hands or lower arms to radiation (e.g., ultraviolet light) that is germicidal but not harmful to the user. Some suitable hand sanitizers include but are not limited to those described in U.S. Pat. No. 4,620,502 (filed Jan. 31, 1986); U.S. Pat. No. 4,956,170 (filed Jun. 28, 1989); and U.S. Pat. No. 6,254,625 (filed Jul. 2, 1998); incorporated herein by reference.

The term "hand hygiene measure", as used herein, is any behaviour resulting in reduced microbial contamination of hands.

As used herein, the term "in communication", as used herein, means that a first component of the systems of the present disclosure transmits a stimulus to a second component for the purpose of causing the second component to act.

Such a resultant action could be to activate a sensor, deactivate a sensor, or vary the resistance for permitting access or the like. The components can communicate by chemical, mechanical, electrical, wireless, radio, infrared signals, or any other means known to one skill in the art.

The term "resistance" means any impedance to achieving a desired goal. As used herein, the term "resistance" can be gaining access, completing a task, workflow, communicating, moving, or any other goal-directed action. "Resistance" can also be physical resistance, requiring increased force, an inconvenience, such as a time delay or a nuisance event or sensation, such as an auditory (e.g., noise, alarm, or the like), visual (e.g., light, flash, announcement board, or the like), olfactory (e.g., smell), gustatory (e.g., taste), or tactile (e.g., vibration, movement, discomfort, or the like) stimulus or an actual physical resistance to movement of all or part of the shared electronic device.

As used herein, the term "shared electronic device" refers to a machine, contrivance or article which is used by more than one person comprising electronic components. The device can be located in a stationary structure (e.g., a hospital, airport, or the like) or in a moving transport object (e.g., a train, boat, airplane, or the like). Examples of shared electronic devices include but are not limited to stationary or mobile computer, a stationary or mobile telephone, copier, fax machine, ATM, touchpad-computer, personal digital assistant, robot, dispensing cabinet, check-in computer, card reader, intercom, polling station, coffee maker, vending machine, equipment controller, gas pump, on-board computer, navigation device, handheld bar-code scanner, timing device, centrifuge, pager, cash register, monitor, light switch, on/off switch, ignition switch, finger print reader, retina scanner, exercise equipment, television, music player, stereo system, juke box, parking meter, washing machine, clothes dryer, dishwasher, microwave, oven, game console, or slot machine.

Referring now to the drawings, wherein like reference numerals denote like or corresponding parts throughout the drawings and, more particularly to FIGS. 1-10, there are shown various embodiments of a system to reduce the spread of infectious microbes by facilitating and rewarding the use of a hand sanitizer dispensing unit.

FIGS. 1-4 illustrate exemplary embodiments of a door opening system (100, 200, 300 (not shown)). The door opening system (100, 200), as disclosed in FIGS. 1-2, allows for the convenient access to a defined or restricted space, such as a building, room (e.g., a restroom), hallway, or closet (e.g., a supply closet), by operably linking the use of a hand sanitizer dispensing unit (101, 201) with a door opening device (103, 203) (e.g., an automatic door opener). For example, the use of a hand sanitizer dispensing unit (101, 201) mounted near a doorway (102, 202) activates an automatic door opener (103, 203), thereby allowing the user to quickly and easily pass through the door threshold without having to manipulate a door knob (106, 206) or latch. In one embodiment of the invention, the door (102, 202) is locked, and activation of the hand sanitizer dispensing unit (101, 201) unlocks and opens the door (102, 202). Alternatively, activation of the hand sanitizer dispensing unit (101, 201) allows for the user to unlock the door (102, 202) by conventional means, for example, by exposing or activating a password, keycode, keycard, or biometric terminal or allowing the use of a physical key.

Figure 2:
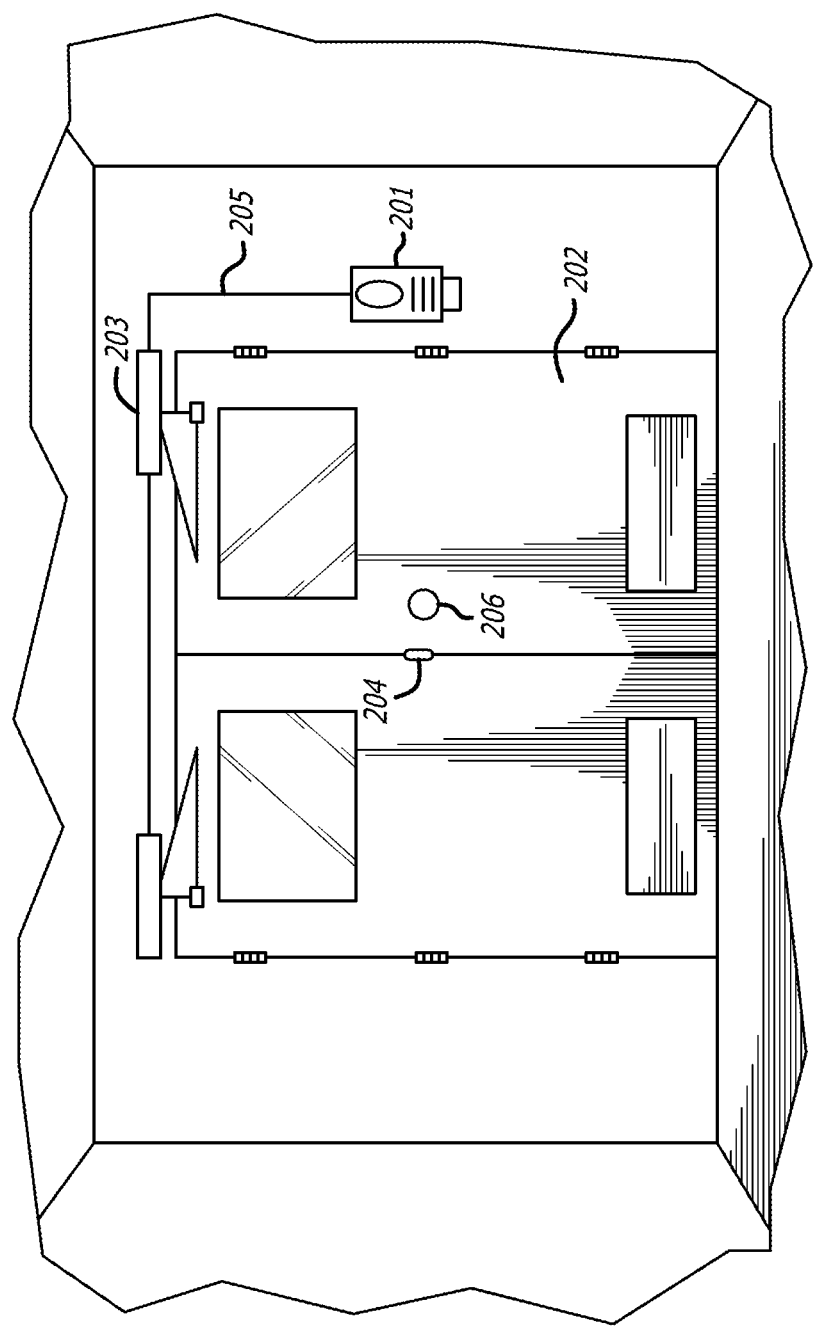
FIG. 2 is a perspective view of the door opening system of the invention in the context of a double door threshold.

The door opening system (100, 200), as disclosed in FIGS. 1-2 include a hand sanitizer dispensing unit (101, 201), a door (102, 202) with a door opening device (103, 203), an electrical, mechanical, or wireless signal connection (105, 205) between the hand sanitizer dispensing unit (101, 201) or a manual override device and the door opening device (103, 203). In some embodiments of the invention, the system (100, 200) further incorporates a locking device (104 and 204) that prevents the door (102, 202) from opening unless the hand sanitizer dispensing unit (101, 201) is activated or the manual override device is utilized. Each of these components is discussed in further detail below.

Any person (i.e., a "user") desiring entry into a space blocked by a closed door (102, 202) can activate the door opening device (103, 203) by using the hand sanitizer dispensing unit (101, 201) to receive a quantity of a hand sanitizer. Use of the dispensing unit (101, 201) initiates two events: 1) the unit dispensation of an effective amount of a chemical or radiological hand sanitizer on to one or both hands of the user and 2) transmission of a signal from the dispensing unit (101, 201) that opens the door (102, 202) to allow the user entry past the threshold.

Alternatively, a user who prefers or cannot activate the hand sanitizer dispensing unit (101, 201) (e.g., in an emergency situation) can still open the door (102, 202) by using a manual override device, as defined herein, attached to the door (102, 202). Accordingly, use of the door opening system (100, 200) of the invention rewards the application of a hand sanitizer with the convenience of a door opening device (103, 203), such as an automatic door opener.

Any single, double, revolving, sliding (e.g., vertical or horizontal sliding doors), overhead, or elevator door can be incorporated into a door opening system of the embodiments of FIGS. 1-2. Doors, when in a closed position and restricting access, can be either locked or unlocked. With respect to an unlocked door, use of the door opening system (100, 200) of FIGS. 1-2 causes a door opening device (103, 203) to open the door upon receipt of a signal from the hand sanitizer dispensing unit (101, 201). Subsequently, the door opening device (103, 203) allows for the convenient passage of a user through a door threshold without the need to manually open the door (102, 202). In addition, the door opening system (100, 200) of FIGS. 1-2 can be applied to a locked door (i.e., a door further equipped with a locking device, as discussed below). In this case, activation of the door opening system (100, 200), by triggering the dispensing unit (101, 201) as described above, is a requisite step the user must take to unlock the door (102, 202).

Figure 3:
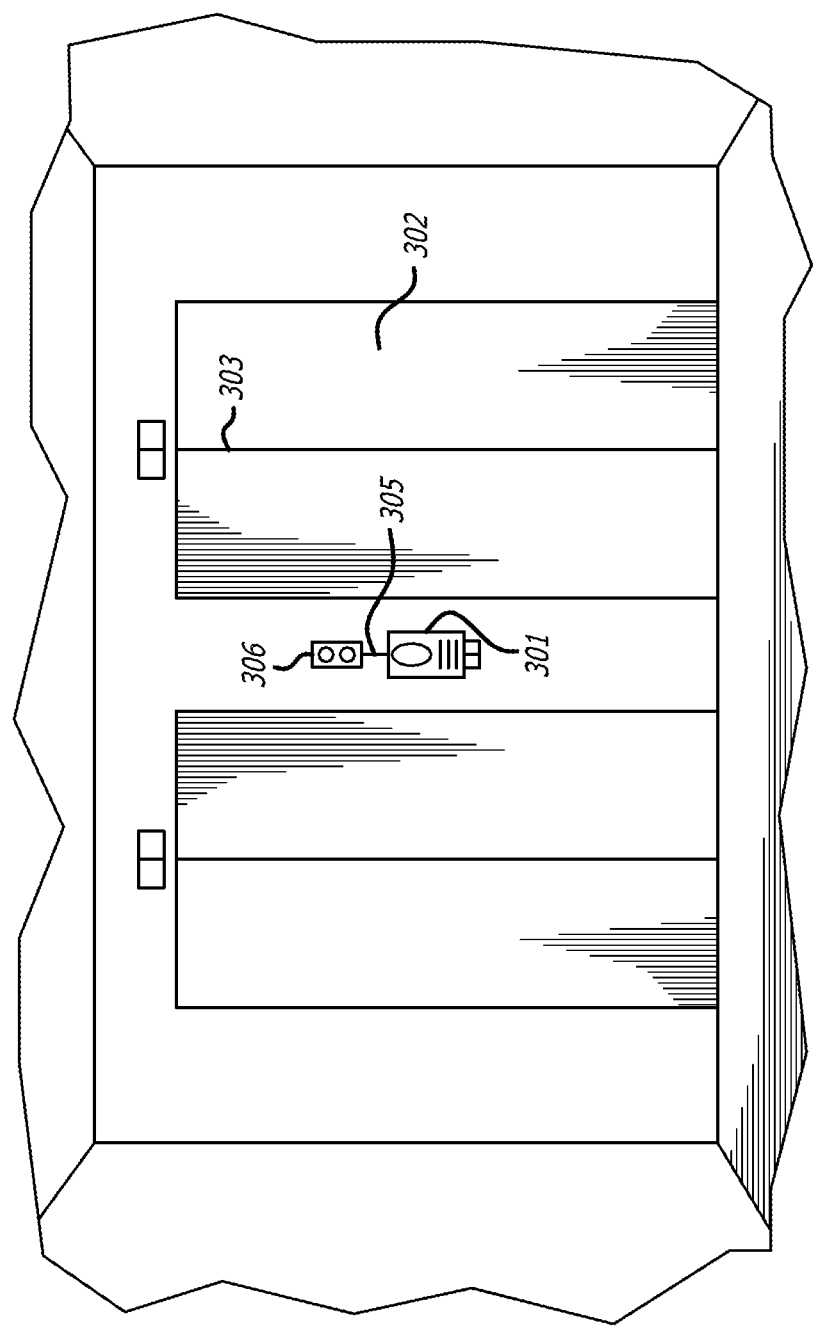
FIG. 3 is a perspective view of the door opening system of the invention in the context of an elevator door.

Elevator doors 302 can also be used in the door opening system of the invention, as illustrated in FIG. 3, according to one embodiment. Typically, elevators must be "called" by pressing a button 306 located near the exterior door 302. When coupled to the system of FIGS. 1-2, activation of a hand sanitizer dispensing unit 301 placed near an elevator door 302 or bank can itself be used as an elevator call signal. Alternatively, the elevator call button 306 remains in an inactive default state that only becomes functional upon the receipt of a signal from the hand sanitizer dispensing unit 301.

The access system of the embodiments of FIGS. 1-3 features locking access doors, panels, or drawers. Such doors, panels, or drawers are commonly found in storage closets, cabinets, carts, and desks.

A door opening device (103, 203, 306) of the embodiments of FIGS. 1-3, is a mechanical device that opens one or more doors upon receipt of a signal from a hand sanitizer dispensing unit (101, 201, 301). The device (103, 203, 306) can use a motor, engine, or hydraulic arm to effect the movement of the door (102, 202, 302). Door opening devices (e.g., mechanical devices, such as hydraulic door openers) are known in the art (e.g., U.S. Pat. Nos. 2,591,693, 3,708,915, 4,660,324, and 4,348,835, herein incorporated by reference in their entirety). Door opening devices, are colloquially known as "automatic door openers" and are frequently encountered when entering supermarkets and other retail spaces. Door opening devices can include a power supply (e.g., an electrical current) if necessary for operation.

In some embodiments, the door opening system (100, 200) of the embodiments of FIGS. 1-2 regulates access to a controlled area by including a locking device (104, 204). In such case, the use of hand sanitizer dispensing unit (101, 201) is necessary in order to open the door (102, 202). For example, use of the hand sanitizer dispensing unit (101, 201) can allow for the subsequent entry of a personal credential (e.g., password, keycode, or biometric reading) or physical key (e.g., a key or keycard) that, in combination, activates the door opening device (103, 203) and opens the door (102, 202).

Locking devices (104, 204) (e.g., a door lock) of the embodiments of FIGS. 1-2 can be based on a mechanical, electrical, or magnetic designs and serve to prevent the movement of a door, panel, or drawer when in a closed and locked position. Locking devices suitable for inclusion in the system of the invention are known to skilled artisans that install and maintain doors, panels, and drawers. Locking devices can include a power supply (e.g., an electrical current) if necessary for operation.

In some embodiments, upon activation, the hand sanitizer dispensing unit (101, 201, 301) of the invention transmits a signal, through a signal connection (105, 205, 305), to the door opening device (103, 203, 306) or shared electronic device, locking device (104, 204), as discussed herein. The signal connection can be wired (e.g., copper electrical wires that physically connect the dispensing unit to the door opening or locking device) to allow the transmission of an electrical signal. Alternatively, the signal connection can be wireless connection. Wireless connections include infrared and radio (e.g., Bluetooth, WiFi/802.11, ZigBee, WiMax, universal mobile telecommunications system (UMTS), general packet radio service (GPRS), code division multiple access 2000 (CDMA2000), global system for mobile communication (GSM), cellular digital packet data (CDPD), high-speed downlink packet access (HSDP A), or third generation (3G) protocol) signals.

Figure 4:
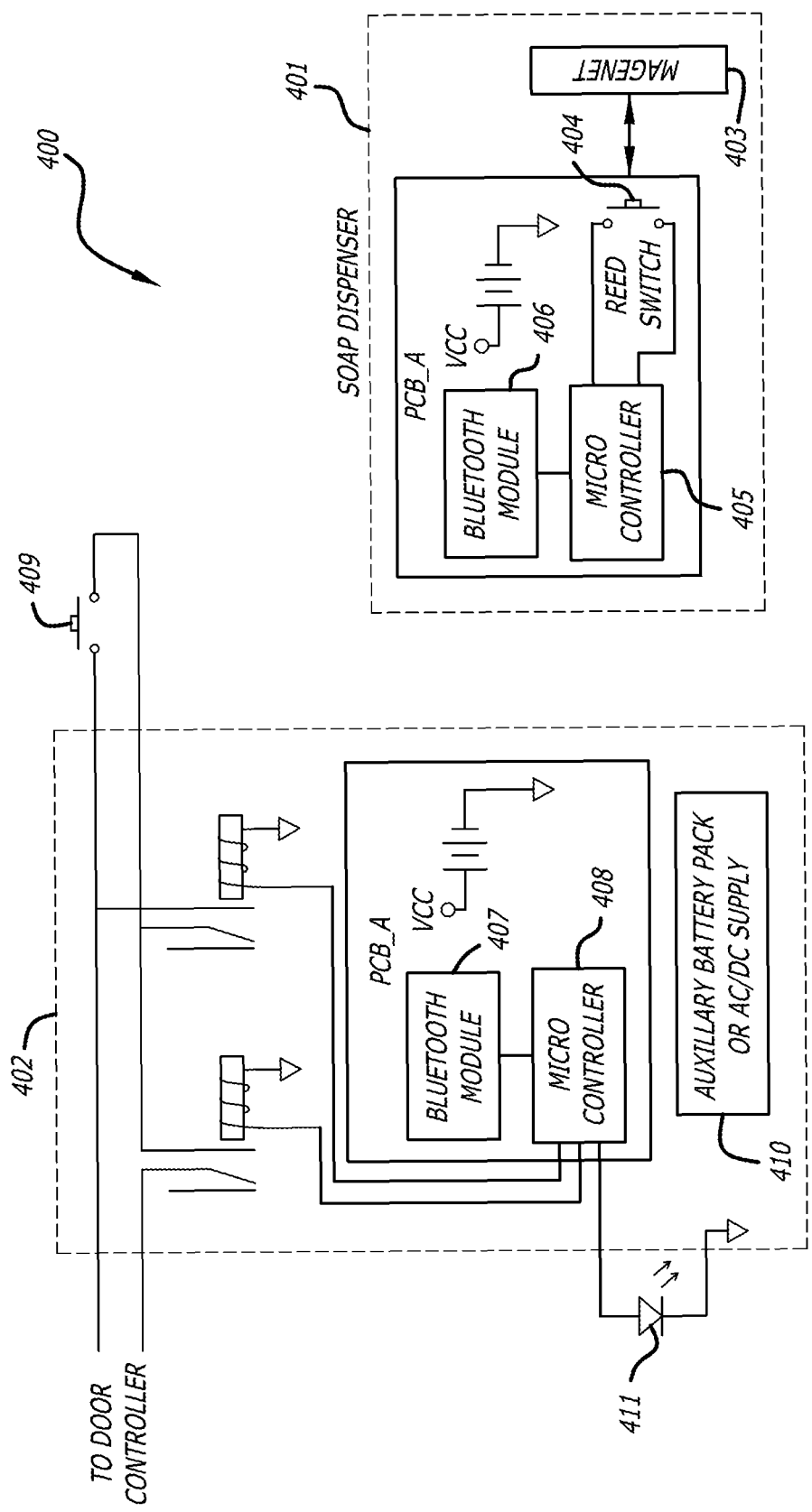
FIG. 4 is a block diagram of a door opening system of the invention that illustrates a wireless hand sanitizer dispensing unit and a receiver control unit operably connected to an automatic door opener.

In one embodiment, as shown in FIG. 4, a dispensing unit 401 includes an electro magnet 403, a reed switch 404, a microcontroller 405 and a Bluetooth module 406. The dispensing unit 401 actives automatically if it senses a hand motion by the user and releases soap or hand sanitizer. As soon as the soap or hand sanitizer is released by the dispensing unit 401, an electro magnet 403 closes a reed switch 404 by moving its position, which sends a signal to a micro controller 405 connected to the Bluetooth module 406. The Bluetooth module 406 receives the signal from the microcontroller 405 and emits the signal. The signal emitted by the Bluetooth module 406 of the dispensing unit 401 is received by another Bluetooth module 407 embedded inside the door opening device 402. The Bluetooth module 407 transmits the received signal from the dispensing unit 401 to a microcontroller 408 embedded inside the door opening device 402. The microcontroller 408 sends a signal to close the switch 409, which in turn opens a locked door.

Upon receipt of a signal through the signal connection (105, 205, 305), the door opening device (103, 203, 306), locking device (104, 204), or shared electronic device is activated or unlocked, allowing the user access past a door (102, 202, 302), panel, or drawer, or allowing the use of the shared electronic device.

Figure 5:
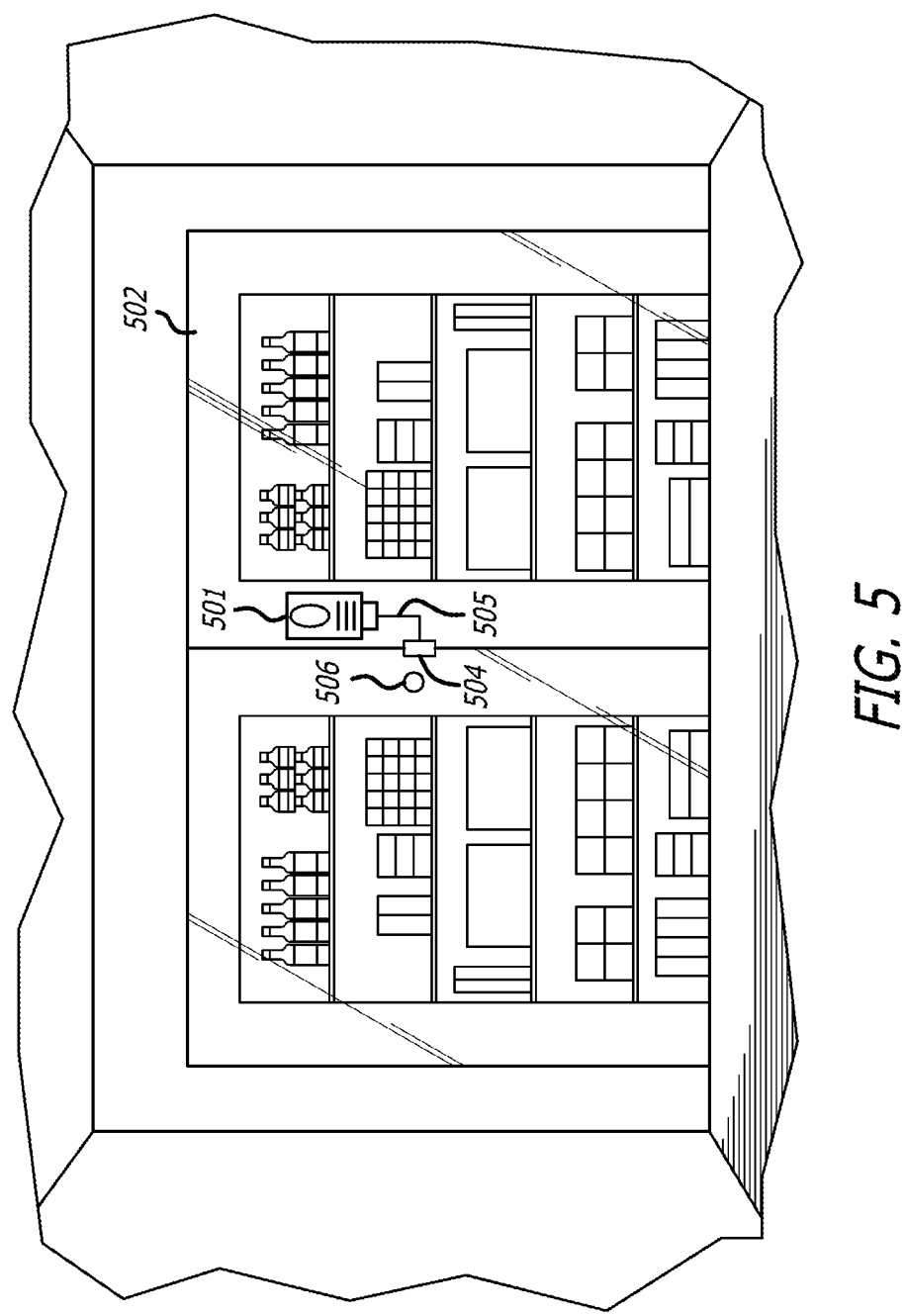
FIG. 5 is a perspective view of the access system of the invention in the context of a medical supply cabinet.

FIG. 5 illustrates an exemplary embodiment of an access system 500 (not shown). The access system 500 encourages or compels the use of a hand sanitizer dispensing unit 501 to gain access to a locked storage area, such as a cabinet, closet, or drawer. Activation of a hand sanitizer dispensing unit 501 sends a signal to a locking device 504 that unlocks an access door 502, panel, or drawer to allow the user access to the protected area. The access system 500 of the invention is particularly well suited for use in health-care environments for the storage of strictly controlled substances, such as anaesthetics and narcotics. Medical storage carts and cabinets used by health-care workers to securely store or transport drugs and medicines in a health-care environment (e.g., a hospital) can incorporate a restricted access system of the method to reduce the spread of infectious microbes by health-care workers to patients.

The access system 500, as disclosed in FIG. 5 includes a hand sanitizer dispensing unit 501, a locking device 504, and an electrical, mechanical, or wireless signal connection 505 between the hand sanitizer dispensing unit 501 and the locking device 504. Each of these components is discussed in further detail below.

The access system 500 of FIG. 5 features a hand sanitizer dispensing unit 501 that is used to gain access to a defined space that is protected by a locked access door, panel, or drawer. In this case, use of the hand sanitizer dispensing unit 501 is required to unlock the access door 502, panel or drawer in order to gain access to the defined space. Alternatively, use of the hand sanitizer dispensing unit 501 is not required to gain entry to the protected space, but rather serves as a convenient method of accessing the space. In this embodiment, the user can select from other methods of unlocking the access door 502, panel, or drawer apart from using the hand sanitizer dispensing unit 501. These other methods include, but are not limited to, the use of a key, keycard, passcard (e.g., identification card), biometric reading, password, or key code. In this embodiment, the convenience of using the hand sanitizer dispensing unit 501 to open the access door 502, panel, or drawer will encourage the use of a hand sanitizer over the relative inconvenience of opening the door 502, panel, or drawer by conventional methods. Furthermore, the access system 500 of the invention can also unlock an access door 502, panel, or drawer by conventional methods (e.g., key, keycard, passcard (e.g., identification card), biometric reading, password, or key code) when used in combination with a hand sanitizer dispensing unit 501. In this exemplary embodiment, the use of the hand sanitizer dispensing unit 501 does not alone unlock the access door 502, panel, or drawer, but enables the user to complete an additional unlocking step or steps, either before or after using the hand sanitizer dispensing unit, that grants the user access to the protected space.

The cabinet, closet, or drawer protected by a restricted access system 500 of the invention can be located in a fixed position (e.g., a storage cabinet or desk) or can be mobile (e.g., a supply cart). For example, medical storage carts and cabinets can incorporate locking devices that require the user (e.g., a physician, nurse, or technician) to first activate a hand sanitizer dispensing unit 501 and then enter a passcode, keycode, or swipe a keycard in order to access the contents of the cart or cabinet.

In one embodiment, use of the hand sanitizer dispensing unit 501 does not initially unlock the locking device 504, but rather resets a programmable relocking interval. For example, in order to prevent unauthorized access, some locking devices 504 can have programmable relocking intervals that require the user to unlock the cart or cabinet frequently (e.g., every 15 minutes). To encourage the frequent use of a hand sanitizer, a locking device 504 with a programmable relocking interval can be used in a restricted access system of the invention. Once the user has unlocked the locking device 504, he or she must activate operably linked hand sanitizer dispensing unit 501 to reset the programmable locking interval and prevent the access door 502, panel, or drawer from re-locking. Alternatively, use of the hand sanitizer dispensing unit 501 increases the relocking interval, for example, by 5 minutes, 10 minutes, 15 minutes, 20 minutes, 30 minutes, 60 minutes, 120 minutes, or longer. In this case, the user, having activated the hand sanitizer dispensing unit 501 and applied a hand sanitizer, is rewarded with the convenience of temporary access to the protected space without the periodic requirement of unlocking the access, door 502, or panel. Thus, activation of the hand sanitizer dispensing unit 501 rewards the user with convenience without requiring the user to continuously unlock the locking device 504 by conventional methods.

Figure 6:
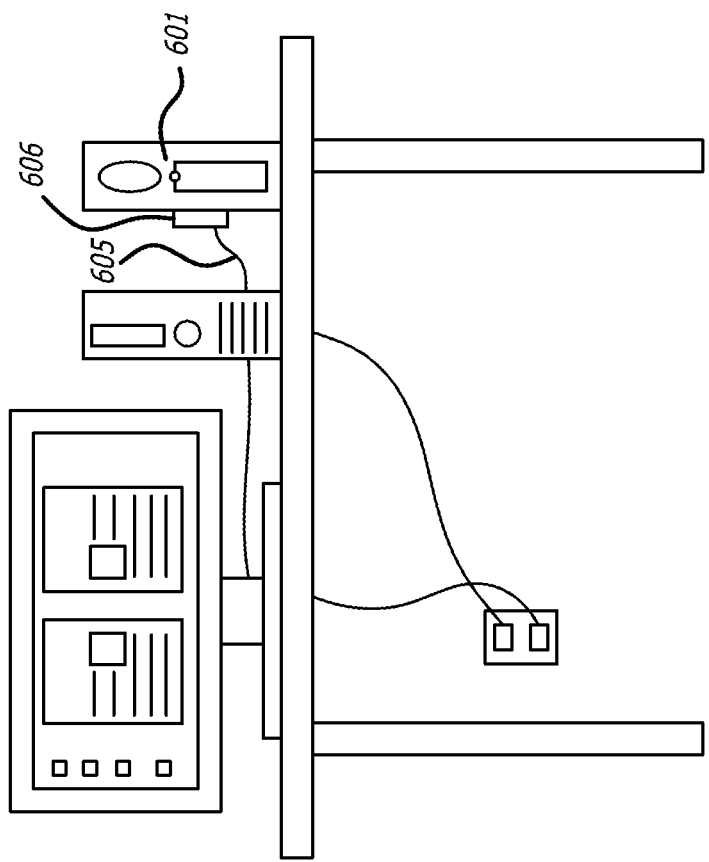
FIG. 6 is a perspective view of the shared electronic device system of the invention in the context of a computer.

FIG. 6 illustrates a perspective view of a shared electronic device according to the different embodiments of the present disclosure, in the context of a computer.

FIG. 7 illustrates an exemplary embodiment of a system 700 comprising a hand sanitizer dispensing unit 701 in communication with a shared electronic device 702, where a user can unlock the screen saver 703 of the shared electronic device 702 by using the hand sanitizer from the hand sanitizer dispensing unit 701. In the exemplary embodiment of FIG. 7, the shared electronic device 702 is a laptop computer. However, a person skilled in the art will appreciate that any other shared electronic devices, for example, any form of computer (e.g., tablet computer, desktop computers, or the like), mobile device, for example, smart phones, or the like can also be used in the system 700.

In one embodiment, the hand sanitizer dispensing unit 701 is in communication with the laptop computer 702 via an electrical, mechanical, or wireless signal connection, and a manual override path, built in to the screen saver 703 of the shared electronic device 702. In some embodiments, the hand sanitizer dispensing unit 701 can be mounted on the laptop computer 702, or next to the laptop computer 702, or in a location remote from the laptop computer 702 of system 700. In another embodiment, the laptop computer 702 is active at baseline and a signal from a sensor detecting presence of a user in the absence of an activation system from the hand sanitizer dispensing unit 701 renders the laptop computer 702 inactive.

Figure 8:
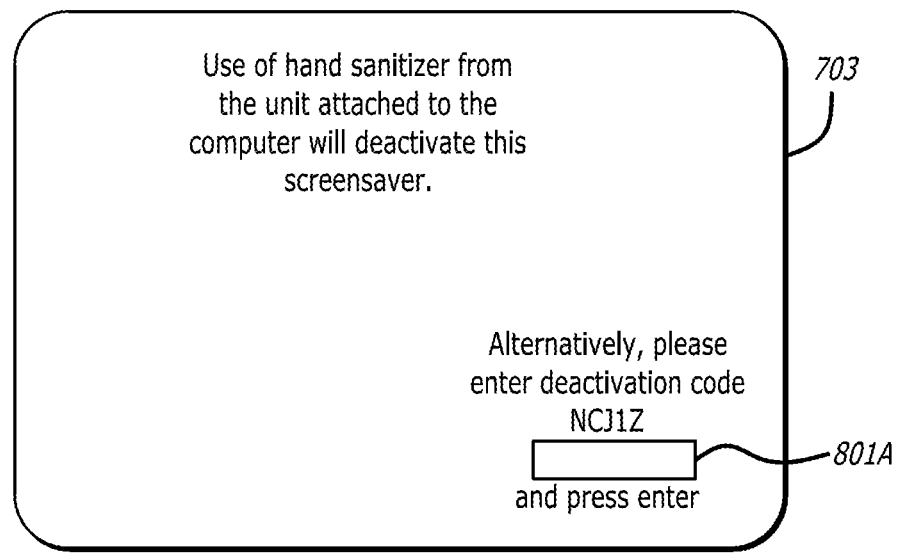
FIG. 8 is a prospective view of a screen saver of the shared electronic device of FIG. 7, according to one embodiment.

FIG. 8 illustrates a prospective view of the screen saver 703 of the laptop computer 702 of FIG. 7, according to one embodiment. The screen saver 703, as shown in FIG. 8, provides the user with instructions on how to access the laptop computer 702. In order to access the laptop computer 702, a path of least resistance is recommended in the instructions on the screen saver 703 of the laptop computer. In some embodiments, the path of least resistance can be completed by using hand sanitizer from the hand sanitizer dispensing unit 701. A user can deactivate the screensaver 703 of the laptop computer 702 by using the hand sanitizer from the hand sanitizer dispensing unit 701 to access the laptop computer 702. In the exemplary system 700, the screen saver 701 allows for the convenient access to the laptop computer 702, by operably linking the use of the hand sanitizer dispensing unit 701 with the screen saver 703 of the laptop computer 702. Use of the hand sanitizer dispensing unit 701 initiates two events: 1) dispensation of an effective amount of a chemical or radiological hand sanitizer on to one or both hands of the user by the hand sanitizer dispensing unit 701 and 2) transmission of a signal from the hand sanitizer dispensing unit 701 that deactivates the screen saver 703 of the laptop computer 702. Once the screen saver 703 of the laptop computer 702 is deactivated, the user can see the same computer screen as he/she saw before a period of non-use of the laptop computer 702 activated the screen saver 703.

In one embodiment, the screen saver 703 of the laptop computer 702 offers a manual override path 801A, which contains resistance in the form of the requirement to enter an access code into a designated field. If a user chooses not to use the hand sanitizer dispensing unit 701 to activate the laptop computer 702, the user can alternatively type in the access code, provided by a random key generator that is part of the system software 704 running in the processor of the laptop computer 702. In some other embodiments, the screen saver 703 is deactivated via the manual override path 801A by the user entering via the keyboard of the laptop computer 702, an access code containing, for example, a combination of numbers, letters and special characters into a predefined space within the screen saver 703. Once the access code is entered correctly by the user, the user can unlock the screen of the laptop computer 702 or make the screen saver 703 disappear to access the laptop computer 702, by pressing the enter button on the keyboard of the laptop computer 702.

In one embodiment, the access code is provided by the screen saver 703 itself and generated randomly by the system software 704, each time the screen saver 703 is activated by a period of non-use of the laptop computer 702. The period of time (e.g., 1 min, 2 min, 3 min, 5 min, 10 min, 20 min, or the like) that activates the screen saver 703 can be chosen by a system administrator of the system 700. During the time of non-use of the laptop computer 702, the user can potentially contact surfaces of items or bodies (for example, during a handshake), from which infectious microbes can be transmitted to the hands of the user. Therefore, by activating the screen saver 703 after a certain time of non-use of the laptop computer 703, the system 700 promotes a prompt use of a hand hygiene measure when the user returns to the laptop computer 702. In some embodiments, the length and complexity of the access code associated with the manual override path 801A is controlled by the system administrator to achieve a desirable level of hand hygiene compliance, which is tracked by the system software 704 linking the hand sanitizer dispensing unit 701 with the screen saver 703 of the laptop computer 702.

In another embodiment, the resistance is altered by varying the length or the complexity of an access code, consisting of, for example, numbers, letters and special characters, or the like. In some embodiments, the access code is provided by the software 704 running in the processor of the laptop computer 702 or in an independent device. The code can alternatively be provided by a person or machine. In one embodiment, the system administrator reduces the complexity of the access code to a minimum required for acceptable compliance with hand hygiene requirements, so that in an emergency, or in case of failure of the hand sanitizer dispensing unit 701, the access to the computer is provided with the greatest possible ease. Instead of typing a code to access the laptop computer 702, the override signal might instead involve a biometric reader (e.g., fingerprint or retinal scanner, an identity card reader or scanner, and the like).

The system 700 is superimposed on any routine means of gaining access to a computer system. Use of the hand sanitizer does not fulfil the requirement to enter security passwords, swipe an ID card, or log in to a secure network by any other means, unless specifically configured to do so by the system administrator.

In some embodiment, an establishment can include a plurality of system 700 to ensure hand hygiene among its employees. In such cases, in case of emergency in the establishment in which hand hygiene is no longer a priority, one or more hand hygiene systems 700 (e.g., all units on one floor) can be centrally deactivated by the system administrator. For example, if a "code blue" is called in a medical intensive care unit, the screen savers 703 of all the laptop computers 702 of the plurality of systems 700 in that unit are inactivated for a period (e.g., 10, 20, 30, 60 or 120 min) controlled by the system administrator. Once the emergency period has elapsed, the screen savers 703 revert to their activated state, where a period of non-use of the laptop computers prompts the users to use the hand-sanitizer dispensing units 701 in order to gain access to their respective laptop computers 702.

The different embodiments of system 700 may be used to reroute the path of least resistance by balancing two levels of resistance to access the shared electronic device 702 (e.g., laptop computer), for example, by a screen saver or telephone. Use of the hand sanitizer lowers the resistance setting, rewarding hand sanitizer use with convenience of having access to the shared electronic device 702 against lower or no resistance. In this case the default setting would be a high resistance that can be lowered or eliminated by using the hand sanitizer from the hand sanitizer dispensing unit 701. Alternatively, the default setting could be a low resistance, which is increased if the shared electronic device 702 is being accessed without prior use of the hand sanitizer. This configuration uses a sensor that is operably connected to an external device 705, which controls the resistances of the two paths, sensing an attempt to access the shared electronic device 702 prior to use of the hand-sanitizer. In some embodiments, the resistance settings can be adjusted by the system administrator to render the manual override path sufficiently more cumbersome to achieve desirable hand hygiene compliance. The external device 705 can be used to modify behaviour and to promote or condition any other desirable behaviour.

In one embodiment, the resistor can be either a nuisance, such as, a virtual or mechanical impedance to access. Examples of nuisances include a visual, auditory, sensory, olfactory or gustatory sensation, a time delay between sending the activation signal and the system unlocking the shared electronic device 702, a reduction in functionality, or the need to enter an override access code. An example of a mechanical resistance is a mechanical or magnetic interaction between two parts of the shared electronic device 702 that are required to be removed from one another in order for the shared electronic device 702 to operate. In this example, the intensity of said interaction is lessened or eliminated by use of the hand sanitizer. Examples of these embodiments include resistance to removing the receiver from a telephone, moving a computer keyboard or mouse from its storage location or moving the arm of a slot machine. In some embodiments, adjusting the resistance to access the shared electronic device 702 may be accomplished by increasing the resistance created by a spring or magnet that mediate the interaction between a stationary part of the shared electronic device 702 and a movable part thereof (e.g., receiver, mouse, etc).

In another embodiment, the shared electronic device 702 of system 700 is a piece of exercise equipment, such as a treadmill or an elliptical machine. Use of the hand sanitizer, which is operably connected to the exercise equipment, would allow normal use thereof for the duration of the workout. The manual override path in this embodiment imposes resistance in the form of limitations of the modes, in which the equipment is useable (for example, only at inclines greater than 3% or only at speeds below 6 miles/hours or only without being able to watch TV concurrently). Instructions as to how to access the path of least resistance can be provided either by the screen saver 703 of the shared electronic device 702 itself, a posted placard, a person or a voice prompt. The manual override path can either be accessed using a button, lever push pad or any other mechanism on the hand sanitizer dispensing unit 701 or remote from the hand sanitizer dispensing unit 701. Alternatively, the system's 700 default setting is the manual override path including the resistance associated with the manual override path.

In one embodiment, the shared electronic device 702 in system 700 is a slot machine, where the hand sanitizer dispensing unit 701 is operably connected to either the system software 704 or the hardware 706 of the shared electronic device 702. In case the system software 704 is responsive to an activation system 707 transmitted by hand sanitizer use, different modes of use are activated, for example, different bet amounts are made possible by using the hand sanitizer. In case the hand sanitizer is connected the hardware 706 component of the shared electronic device 702, the resistance of the manual override path, which is removed by hand sanitizer use, is added to the arm of the slot machine. The resistance can be added by a spring, magnet, solenoid valve controlled-piston, added to the arm or a motor that, at the same time as adding resistance to physical movement, generates power, that can be used to power the system 700 or other devices connected to the same grid. In some other embodiments, resistances can be combined to result in an initial resistance, followed by another resistance, for example, by combining the need to enter and access code manually followed by a time delay from completion of the requirement to enter an access code manually until the shared electronic device 702 is responsive to the user.

The individual components of the system 700 are described in further detail below.

Hand Sanitizer Dispensing Unit

Figure 9:
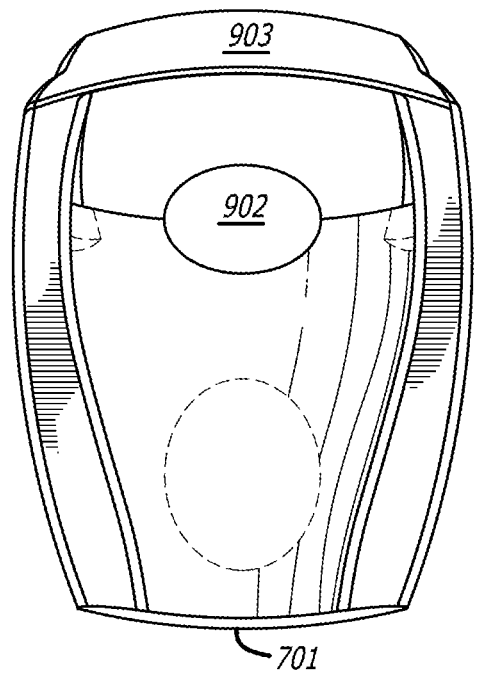
FIG. 9 is a prospective view of the hand sanitizer dispensing unit of FIG. 7, according to one embodiment.

FIG. 9 is a prospective view of one embodiment of the hand sanitizer dispensing unit 701 of system 700. In one embodiment, the hand sanitizer dispensing unit 701 is a device that, upon activation, dispenses, applies, or exposes a predetermined and effective amount of a hand sanitizer to the hands of a user. The hand sanitizer dispensing unit 701 comprises a transmitter 903 and a switch 902. The hand sanitizer in the hand sanitizer dispensing unit 701 can be chemical (e.g., an alcohol-based sanitizer) or radiological (e.g., ultraviolet light), according to the current embodiments of the disclosure.

In some embodiments, a chemical hand sanitizer dispensing unit dispenses a measured quantity (e.g., 0.5 mL, 0.75 mL, 1.0 mL, 1.25 mL, 1.5 mL, 1.75 mL, 2.0 mL, 2.5 mL, 3.0 mL, 3.5 mL, 4.0 mL, 4.5 mL, 5.0 mL or more) of a chemical hand sanitizer that, when applied evenly over the surface of both hands, is effective in reducing or eliminating microbes. The chemical hand sanitizer dispensing unit can consist of a structural or ornamental casing, a reservoir to hold a quantity of chemical hand sanitizer, a dispensing head or nozzle, and an activation trigger, such as a button, lever, or pull arm. Upon dispensation of a chemical hand sanitizer, the user rubs his or her hands together to evenly apply the sanitizer.

In one embodiment, the hand sanitizer dispensing unit 701 can be applied, embedded or otherwise associated with a substrate (see, U.S. Pat. No. 4,620,502, filed on Jan. 31, 1986, incorporated herein as reference in its entirety). For example, a towel, a towelette or disposable hand wipe can be dispensed from the hand sanitizer dispensing unit 701 that contains or is infused with a chemical hand sanitizer. The towel can be dispensed ready-to-use, or can be packaged (e.g., in foil wrapping) to preserve moisture content. Upon receipt of the towel, the user contacts it to his or her hands to apply the chemical hand sanitizer evenly over the surface of the skin.

In some embodiments, the hand sanitizer dispensing unit 701 emits radiological energy (e.g., ultraviolet light) upon activation. Exposure of the user's hands to this energy is effective in reducing or eliminating infectious microbes from the surface of the skin.

In system 700, the hand sanitizer dispensing unit 701 is required to be activated in order to release a hand sanitizer or sanitizing towel. In one embodiment, the hand sanitizer dispensing unit 701 is activated by the user by providing an affirmative stimulus to the unit. Stimuli may include, for example, pushing or pulling a lever or stepping upon or touching a pressure or weight-sensitive pad or button, such as the switch 902. Alternatively, a dispensing unit can be activated by sound (e.g., a voice or hand clap), proximity (e.g., optical (for example, visible spectrum, magnet strips, ID cards), infrared, or thermal detection of user proximity), or motion (e.g., detection of a hand or finger close (e.g., 6 inches or less) to the dispensing unit).

In one embodiment, the hand sanitizer dispensing unit 701 can also dispense an emollient, such as a moisturizing crème, lotion, or salve, upon activation. Frequent use of chemical hand sanitizers can lead to uncomfortable, dry, or damaged skin, which serves to reduce compliance with hand hygiene protocols. The different embodiments of the hand sanitizer dispensing units 701 of system 700 can dispense a therapeutic emollient at random or pre-determined intervals, or upon expressed request by the user to mitigate the skin damage caused by chemical hand sanitizers. For example, in one embodiment, the hand sanitizer dispensing unit 701 can dispense an emollient instead of a hand sanitizer upon every 2nd, 3rd, 4th, 5th, 6th, 7th, 8th, 9th, 10th, or more activation of the hand sanitizer dispensing unit 701. Alternatively, in another embodiment, the hand sanitizer dispensing unit 701 tracks and records the use of the hand sanitizer by individual users can be programmed to provide an emollient in lieu of a hand sanitizer according to a pre-determined interval.

In some embodiments, the hand sanitizer dispensing unit 701 can also allow for the express dispensation of an emollient by incorporating a dedicated button, lever, or other affirmative stimulus, as described above, that specifically controls release of the emollient. By allowing the user to select or have the chance of receiving an emollient upon activation, the hand sanitizer dispensing unit 701 encourages the use the hand hygiene system 700 by the users. The hand sanitizer dispensing unit 701 also prevents skin damage caused by frequent application of chemical hand sanitizers.

According to one embodiment, the hand sanitizer dispensing unit 701 can be mounted to a wall, door, table, desk, or cart. Alternatively, according to another embodiment, the hand sanitizer dispensing unit 701 can be free-standing (e.g., placed on a desk or table), suspended (e.g., from the ceiling), or supported by an integrated or attached stand. A hand sanitizer dispensing unit 701 can be permanently mounted at a specified location, or can be configured for mobility (e.g., attachment to a mobile object, such as a push-cart).

In some embodiments, location of the hand sanitizer dispensing unit 701 can enable towards efficient practice of the system 700. For example, when incorporated into the laptop computer 702 of the system 700, the hand sanitizer dispensing unit 701 is located on or near the computer screen 703, to which it regulates access. Instructional signs can be placed near the laptop computer 702 or hand sanitizer dispensing unit 701 to advise a user unfamiliar with the system 700 (i.e., activating the hand sanitizer dispensing unit 701 to access the laptop computer 702), how to activate the hand sanitizer dispensing unit 701 in order to access or unlock the laptop computer 702. The instructions allows even a first-time user to quickly understand that the activation of the hand sanitizer dispensing unit 701 and receipt of a hand sanitizer allows easier access of the laptop computer 702.

In one embodiment, the hand sanitizer dispensing unit 701 is operably linked, by way of transmitter 903 or a signal connection, or the like, to more than one the shared electronic device 702. For example, a hand sanitizer can be operably linked to 1, 2, 3, 4, 5, 6, 7, 8, 9, 10, or more the shared electronic device 702. Conversely, a single shared electronic device 702 can be operably linked, by way of a signal connection, to more than one hand sanitizer dispensing units 701.

Figure 10:
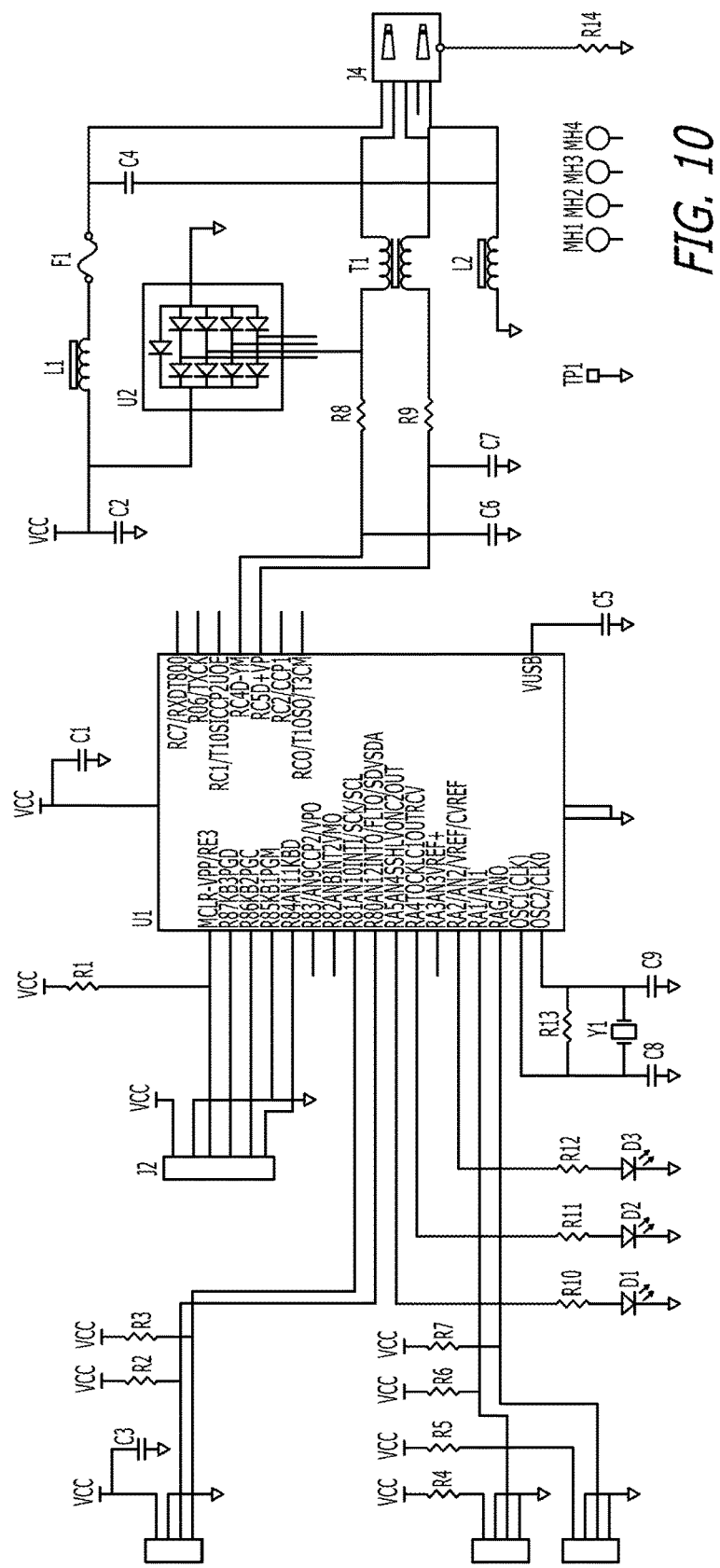
FIG. 10 illustrates a circuit diagram representation of an electronic system embedded inside the hand sanitizer dispensing unit of FIG. 7, according to one embodiment.

FIG. 10 illustrates a circuit diagram representation of an electronic system 707 embedded inside the hand sanitizer dispensing unit 701 of FIG. 7, according to one embodiment. In one embodiment, the electronic system 707 embedded in the hand sanitizer dispensing unit 701 generates and transmits the activation signal to the laptop computer 702 via a USB connection.

Shared Electronic Device

Any device, containing electronic components that are used by more than one person (although not necessarily at the same time), can be used as the shared electronic device 702 of the system 700. Shared electronic devices can be either locked or unlocked at baseline. With respect to a locked device (e.g. a computer, with a screen saver), use of the hand sanitizer might deactivate the screen saver 703, or lessen the work required to do so, rendering use of the hand sanitizer more convenient than use of the manual override path. However, in order to manually deactivate the screen saver 703, a user of the system 700, needs to enter an override code into a field within the screen saver 703, thus associating the manual override path with greater resistance than the hand hygiene path. An advantage of this embodiment is that the computer screen 703 serves several functions of the invention simultaneously, namely, to place the shared electronic device 702 into a baseline inactive (protected) state, to mediate both the path of least resistance and the path of greater resistance, and to instruct the user in how to use either path to access the shared electronic device 702. In the exemplary embodiment system 700, the shared electronic device 702 is a laptop computer. However, a person skilled in the art will appreciate that any other shared electronic device, for example, any form of computer (e.g., tablet computer, desktop computers, mobile device, for example, smart phones, ATM, touchpad-computer, check-in computer, television, game console, or the like.

Not all shared electronic devices have a screen powerful enough to integrate the functions, as described with respect to the different embodiments of system 700. In devices with limited screens (e.g. telephones, mobile telephone, copier, fax machine, personal digital assistant, dispensing cabinet, card reader, intercom, coffee maker, vending machine, equipment controller, gas pump, navigation device, timing device, pager, cash register, exercise equipment, DVD player, stereo system, juke box, parking meter, washing machine, clothes dryer, dishwasher, microwave, oven, slot machine, or the like) fewer or none of the required functions of the system 700 may be performed by the screen. In such cases, the functions can be performed by features other than the screen.

In one embodiment, the electric device 702 of system 700 is a slot machine and none of the functions of the system 700 are performed by a screen 703. In the case of a slot machine, instructions are provided to educate the user on the benefits of use of the hand sanitizer, which is, the use the hand sanitizer allows for convenient gaming session without adding resistance to operating the machine at full functionality. These instructions may be displayed by a sign in close proximity to the slot machine, or provided in the form of a voice recording of the instructions introducing the two access paths, the path of least resistance incorporating hand hygiene, and the manual override path featuring a greater resistance. In the current embodiment, neither of the paths is mediated by a screen. Instead, the two access paths are mediated by features inherent in the function of the machine, such as the amount allowed betting, the resistance of the lever arm that is pulled to start a game or a time delay prior to starting the next game.

In some embodiment, if the shared electronic device 702 of the system 700 is a telephone, the instructions are displayed in close proximity to the telephone or provided by some other external means (e.g., recorded voice prompt, person explaining how to access the phone by using hand sanitizer, etc). However, the manual override path would still be mediated by the screen 703. In this embodiment, if the user is informed that the phone will be activated by use of the hand sanitizer, or that the user can choose to enter on override access code into the phone keypad. The override code is randomly generated and displayed on the phone screen and the complexity of the code is under the control of the system administrator. In this case, the path of least resistance is not mediated by a screen, that is the screen is unlocked or activated by use of the hand sanitizer, but a dial tone that appears in response to hand sanitizer use, that indicates operability of the phone.

In some embodiment, the shared electronic device 702 of the system 700 can be any of a light switch, on switch, off switch, ignition switch, equipment controller, timing device, washing machine, clothes dryer, vending machine, ATM, a touchpad-computer, an intercom device, bar-code scanner, gas pump, a cash register, an exercise equipment, a DVD player, a stereo system, a juke box, a parking meter, a game console, a robot, a dispensing cabinet, a check-in station, a polling station, a gambling machine, part of a cabinet, closet, locker, cart, or transfer box and the mixer thereof.

Sensors and Interface Software

The different embodiments of the hand hygiene system 700 can comprise a plurality of sensors. The sensors of the system 700 can be a motion sensor, a light beam, a laser beam, a mechanical sensor (e.g., pressure on the floor, hinged sensor arm, scale), temperature sensor, airflow sensor, noise sensor or any other sensor capable of detecting proximity or presence of an individual with the potential of attempting to use the shared electronic device 702 without prior use of hand hygiene measures.

Inherent in the concept of adjusting the levels of convenience associated with the desired behaviour (hand hygiene compliance) and the undesired behaviour (manual override) in order to modify either behaviour to an acceptable level is the ability of the system to record the frequency with which each access mode is chosen. In some embodiments, a first sensor 707 within the system hardware 706 is operably connected to the system software 704 and records the proportion of time the shared electronic device 702 is accessed via hand sanitizer use, as opposed to manual override. This information is electronically stored in the memory of the shared electronic device 704, which is interrogated by the system administrator or transmitted to the system administrator via a wired or wireless connection at predetermined intervals or continuously. The data may be used to create a live feedback to user groups interested in these data. The information provided by the system 700 to the administrator may also be useful for documentation of efficacy of hand hygiene efforts. The spirit of the system 700 dictates that recording the identity of the user is not necessary. Hand hygiene compliance should be achievable purely by providing convenience.

In one embodiment, a second sensor 708 within the system hardware 706 serves to alert the system administrator of the need to refill the hand sanitizer when levels of hand sanitizer are approaching zero. The second sensor 708 can be an optical sensor, a weight sensor, a float or any other sensor conventionally used for fluid levels.

In another embodiment, a third sensor 709 within the system hardware 706 of the hand hygiene system 700, detects either proximity of a user or an attempt to access the shared electronic device 702 without prior use of the hand sanitizer. This results in arming the system 700 by adding one or more resistances (for example, the requirement to enter an access code manually combined with a time delay to responsiveness of the shared electronic device 702) to access the shared electronic device 702 until either the hand sanitizer is used (or whatever other to-be-rewarded action is performed) or the user disappears. The third sensor 709 enables the system 700 to operate in a sleep mode and is armed only when it senses that access is attempted without first performing the desired behaviour (e.g., use of hand sanitizer by the user).

In yet another embodiment, a fourth sensor 710 within the system hardware 706 of the hand hygiene system 700, gathers data about the energy state of the system 700. It informs the system administrator about the remaining battery life and sends out an alert in case the battery approaches critically low charge (for example, by 1, 2, 3, 5, 10, or 20 days of battery life remaining).

Optionally, a fifth sensor 711 may be incorporated to the system 700 by the user, if the identity of the person using the hand sanitizer or the override path is desired. This is accomplished by incorporation of near field communication technology, card readers, blue tooth devices, biometric readers or any other means known in the art, to uniquely identify a user. The fifth sensor 711 allows the system 700 to generate compliance data for each individual user.

Appendix A is a text file of the firmware code of the system software 704 that provides interface between the hand sanitizer dispensing unit 701 and the shared electronic device 702. The system software 704 allows interrogation of the number of access events, activation events or uses of the shared electronic device 702 via the path of least resistance compared to the manual override path. It also allows for changing the settings of the resistance of the manual override path. In one embodiment, the system software 704 records the number of activations of the path of least resistance via use of the hand sanitizer versus the number of activations of the manual override path. The system software 706 also allows varying the length and the complexity of the access code of the manual override path 801A.

Further, the system software 706 allows interrogation of the energy state of the system 700 as well as a diagnostic scan of the integrity of system 700 components, including, but not limited to the volume of hand sanitizer remaining in the hand sanitizer dispensing unit 701 and the projected time at which refilling of the hand sanitizer becomes necessary. The charge of the energy source is given, as well as the number of minutes the screensaver will remain deactivated, in the event of non-use of the shared electronic device 702. The system software 704 can communicate the findings to the system administrator or other individuals interested in the use and maintenance statistics of the system 700. This communication can occur via a designated communication pathway, such as a wired (e.g., USB, firewire) or wireless connection (e.g., blue tooth, IR, NFC) to a remote computer, display, screen, monitor, pager, recording device or printer.

As discussed above, the hand sanitizer dispensing unit 701 is in communication with the shared electronic device 702 via a wired connection (e.g., copper electrical wires that physically connect the dispensing unit to the door opening or locking device), or a wireless connection (e.g., Bluetooth, WiFi/802.11, ZigBee, WiMax, universal mobile telecommunications system (UMTS), general packet radio service (GPRS), code division multiple access 2000 (CDMA2000), global system for mobile communication (GSM), cellular digital packet data (CDPD), high-speed downlink packet access (HSDPA), or third generation (3G) or fourth generation (4G) protocol). In the exemplary embodiment of system 700, the hand sanitizer dispensing unit 701 contains a wireless transmitter 903 that emits a signal upon activation of the hand sanitizer dispensing unit 701. Upon receipt of a signal through the signal connection, the additional resistance imposed by the manual override path 801A of the shared electronic device, is de-activated, allowing the user easier an access to the shared electronic device 702.

Manual Override Device

In one embodiment, the shared electronic device 702 of the hand hygiene system 700 includes a manual override device with a manual override path 801A that allows the user to access the shared electronic device 702 without first activating the hand sanitizer dispensing unit 701. For example, a user with an allergy to a chemical hand sanitizer can utilize the manual override device to access the shared electronic device 702 against a higher resistance without activating the hand sanitizer dispensing unit 701.

In some embodiments, the manual override device can be electronic or mechanical in operation. A manual override device attached to a hand sanitizer dispensing unit 701 can incorporate a handle, knob, push plate, pull bar, lever, button or any other means of triggering an access path that does not require using the hand sanitizer dispensing unit 701. In the case of a locked, dormant, hibernating or inactive shared electronic device 702, a manual override device negates the necessity to activate the hand sanitizer dispensing unit 701. However, a user can unlock the shared electronic device 702 by means that do not involve hand hygiene measures. In such case, the manual override device makes the unlocking more difficult than it would be if the hand sanitizer were used. This can be achieved, by adding a resistance or a series of resistances to the system 700.

In one embodiment, the system 700 eliminates the additional resistance after a time interval (for example, 1, 2, 3, 5, 10, 20, 60, 100, or 1000 seconds), in which case the time delay to convertion to the low resistance pathway functions as the inconvenience (i.e. resistance) associated with the manual override (high resistance) path.

In one embodiment, manual override also encompasses a third party manually providing access to the shared electronic device 702, as an alternative means of using the hand sanitizer, in locations, such as, prisons or public buildings. In some other embodiments, the manual override device have built-in and adjustable levels of inconvenience (that are under the control of the system 700) to ensure that hand sanitizer use is always more convenient than use of the manual override device.

Power Supply

In some embodiments, the power to the system 700 can be drawn from the same source that powers the shared electronic device 702, for example, an external source or from an energy recovery device built into the system 700. The current embodiment of system 700 is powered via the USB port. The USB connection charges a battery inside the hand sanitizer dispensing unit 701. Therefore, in the event the hand sanitizer dispensing unit is temporarily disconnected from the shared electronic device 702, it will remain operable for a limited period of time. Since the system software 704 monitors the energy state of the system 700, an alert can be sent to the system administrator (e.g., via e-mail, text, fax, pager or phone) when the system 700 reaches a critical energy state, so that the power can be reconnected.

Advantages and Uses of the Hand Hygiene System

The different embodiments of the hand hygiene system 700 provide a non-punitive, titratable, anonymous and convenient method to reduce or eliminate the transmission of infectious microbes amongst humans. It is designed to reroute the path of least resistance to incorporate hand hygiene measures by rewarding good behaviour (for example, hand hygiene) with the convenience of the low resistance pathway. The level of resistance is adjustable so as to make the higher resistance pathway only as inconvenient as required to achieve an acceptable degree of compliance with hand hygiene measures. Access can usually be obtained either through the path of least or greater resistance. This permissive nature makes it uniquely suited for situations in which undesirable behaviours are the result of the path of least resistance against an otherwise knowledgeable user, who, in principle, is willing to behave in a desirable manner. The different embodiments of the hand hygiene system 700 leaves the choice, as to whether to do the right thing or not, with the individual. The resistances can be modified, in such a manner, that the overall performance of users is acceptable, while retaining a maximum degree of convenience and safety, even for the higher resistance pathway. The application of the present system to several settings is considered below:

The different embodiments of the system 700 can be located in a hospital, nursing home, day care, prison, school, bank, public building, government facility, stationary or mobile military facility, casino, laundromat, car, van, bus, truck, research facility, police station, gym, pool, office building, restroom, stadium, library, museum, public meeting or working space, retail store, grocery store, cafeteria, restaurant, cafe, kitchen, food production or processing facility, public transportation station, or public transit vehicle. When located in a hospital, the system 700 can be located in a hospital emergency room (ER), intensive care unit (ICU), operating room (OR), surgical preparation room, sub sterile room, anaesthesia induction room, outpatient facility, birthing room, pharmacy, cafeteria, restroom, elevator bank, or waiting room. The present systems can be located in public transportation stations, such as an airport, train station, subway station, or bus station, or in a mode of transportation, such as an airplane, train, subway train, bus, or boat, such as a passenger cruise ship. In some embodiments, the system 700 includes instructions for the use of the hand sanitizer dispensing unit 701, or manual override device given on the display of the shared electronic device or additional devices or persons either in auditory, visual or tactile form.

1. Health-Care Facilities

The different embodiments of the system 700 can be used in locations where it is extremely important to control the spread of microbes and pathogens that cause health-care-associated infections. As discussed, hospitals and other health-care facilities (e.g., nursing homes, outpatient clinics, and blood-donation centres) suffer from high transmission rates of microbial infections, greatly increasing the morbidity and mortality of those receiving medical treatment at these facilities. Shared electronic devices are very common in healthcare facilities. Medical records are now almost uniformly electronic, lab results, reports and progress notes are created electronically; as are operative reports, consults and clinic notes.

In the perioperative setting a computer is used in every location a patient receives medical care while live patient data are recorded to create a medical record. Physicians' orders are given electronically and checked off electronically by nursing staff. When an order has been carried out it is then charted as such, in the patient's electronic medical records. This means that use of the computer keyboard and patient contact are frequently alternating events, making a computer keyboard a likely site of transmission of infectious microbes from one health care provider to another. The different embodiments of the system 700 can increase hand hygiene compliance prior to accessing computers, and thus, can stop the spread of infection through computer keyboards. At the same time, the different embodiments of the system 700 reduce the overall microbial load per patient care unit, thus potentially reducing disease transmission at other sites as well.

2. Food Preparation

Food preparation and service facilities where meat, poultry, vegetables, fruit and/or dairy products intended for human or animal consumption are handled, are particularly vulnerable to harbouring and transmitting microbial infections. Such facilities include but are not limited to slaughterhouses; food collection, processing, packing, and storage facilities; kitchens; cafeterias; and restaurants are particularly vulnerable. It is recognized that transmission of microbial pathogens from the hands to food products is a frequent means of communicating diseases, often responsible for severe illness or death. Numerous episodes involving fatalities due to contamination of food products during food handling have increased the public awareness of the serious consequences of poor hygiene in food preparation, distribution, or consumption settings. Although proper hand hygiene is typically stressed, the reality is often poor compliance by the food preparers, handlers, cooks, and servers. In these food preparation settings, the different embodiments of the system 700 will encourage preparation and service personnel (e.g., butchers, harvesters, meat packers, and waiters) to apply a hand sanitizer to their hands prior to use of shared electronic devices, such as the cash register, handheld barcode scanner, machine controller, the oven the microwave oven and the like.

3. Public Modes of Transportation

Public modes of transportation and transportation stations (e.g., an airport), are locations that are vulnerable to harbouring and transmitting microbial infections. These environments are ideal for the transmission of disease-causing pathogens due to the close proximity of many people, often in the absence of hand-washing facilities. Transportation stations have many publicly shared devices that are frequently touched by the masses and thus, are prime locations for the transmission of disease, such as, ticket vending machines or check-in computers. These sites are the perfect location for the systems of the present invention. By providing a path of least resistance to access shared electronic devices such as ticket vending machines, food vending machines, ATMs and check-in computers, passengers are encouraged to use hand hygiene measures.

4. Schools, Colleges, Universities

Schools are paid for pupils' attendance. For every child that cannot attend school due to sickness, the school loses money. Seasonal illnesses like the flu, rotaviruses, respiratory syncytial viruses or other virus strains causing upper respiratory and/or gastrointestinal symptoms are transmitted from the hands of one infected person to the hands a heretofore uninfected person that has now contracted the virus. Many schools, colleges and universities use shared electronic devices as teaching aides including computers and personal digital assistants. Tying access to these devices with hand hygiene measures has the potential to yield hand hygiene intervention in a population that is otherwise difficult to target.

5. Public Gatherings

Many of us have made the experience that coming home from a convention or trade show marks the beginning of an episode of sickness. Shaking hands with people frequently is a source of direct transmission of infectious microbes. The check-in process to conventions and tradeshows has recently been streamlined through the use of shared electronic devices. Passes are printed out at central printer facilities after checking in at a computer terminal. If access to the computer were facilitated by use of a hand sanitizer, the burden of infectious microbes would likely be reduced. Many vendors and participants of conventions use handheld barcode scanning devices as a means to quickly and conveniently gather the information of potential clients. If this interaction, which is almost always associated with a handshake, were preceded by use of a hand sanitizer, spread of infectious microbes ought to be limited substantially.

All documents cited in the Detailed Description are, in relevant part, incorporated herein by reference; the citation of any document is not to be construed as an admission that it is prior art with respect to the present invention.

While particular embodiments have been illustrated and described, it would be obvious to those skilled in the art that various other changes and modifications can be made without departing from the scope of the invention. It is therefore intended to cover in the appended claims all such changes and modifications that are within the use.

What is claimed:

1. A hand hygiene system comprising:
   a hand sanitizer dispensing unit that dispenses a hand sanitizer;
   a shared electronic device in communication with the hand sanitizer dispensing unit; and
   a manual override device, wherein
      the hand sanitizer dispensing unit transmits an activation signal to the shared electronic device, the shared electronic device upon receipt of the activation signal, reduces resistance to access to the shared electronic device,
      the manual override device allows access to the shared electronic device independent of the activation signal of the hand sanitizer dispensing unit, and the manual override device provides greater resistance to access the shared electronic device than provided from the receipt of the activation signal.

2. The system of claim 1, wherein the hand sanitizer is selected from a group consisting of chemical sanitizer, radiological sanitizer or mixtures thereof.

3. The system of claim 2, wherein the chemical sanitizer is selected from a group consisting of ethanol-based sanitizer, triclosan, protein-based sanitizer and mixtures thereof.

4. The system of claim 2, wherein the chemical sanitizer is applied with a substrate.

5. The system of claim 3, wherein the chemical sanitizer further comprises an emollient.

6. The system of claim 2, wherein the radiological sanitizer is ultraviolet light.

7. The system of claim 1, wherein the hand sanitizer dispensing unit dispenses an emollient at random or prescribed intervals.

8. The system of claim 1, wherein the shared electronic device is a telecommunication device selected from a group consisting of a stationary computer, a mobile computer, a stationary telephone, mobile telephone, a pager, a radio, a television, navigation device and mixtures thereof.

9. The system of claim 1, wherein the shared electronic device is selected from a group consisting of a photocopier, a fax machine, a scanner, a printer and mixtures thereof.

10. The system of claim 1, wherein the shard electronic device is selected from a group consisting of an oven, a microwave oven, a coffee maker, a dishwasher and mixtures thereof.

11. The system of claim 1, wherein the shared electronic device identifies a user of the system via a card reader, a retina scanner, a finger print reader, incorporated into the system.

12. The system of claim 1, wherein the shared electronic device is a switch selected from a group consisting of a light switch, on switch, off switch, ignition switch, equipment controller, timing device and mixtures thereof.

13. The system of claim 1, wherein the shared electronic device is selected from the group consisting of washing machine, clothes dryer, vending machine and mixtures thereof.

14. The system of claim 1, wherein the shared electronic device is selected from the group consisting of an ATM, a touchpad-computer, an intercom device, bar-code scanner, gas pump, a cash register, an exercise equipment, a DVD player, a stereo system, a juke box, a parking meter, a game console and mixtures thereof.

15. The system of claim 1, wherein the shared electronic device is a robot.

16. The system of claim 1, wherein the shared electronic device is a dispensing cabinet.

17. The system of claim 1, wherein the shared electronic device is a check-in station.

18. The system of claim 1, wherein the shared electronic device is a polling station.

19. The system of claim 1, wherein the shared electronic device is a gambling machine.

20. The system of claim 1, wherein said shared electronic device is part of a cabinet, closet, locker, cart, or transfer box.

* * * * *